United States Patent Office 2,777,513
Patented Jan. 15, 1957

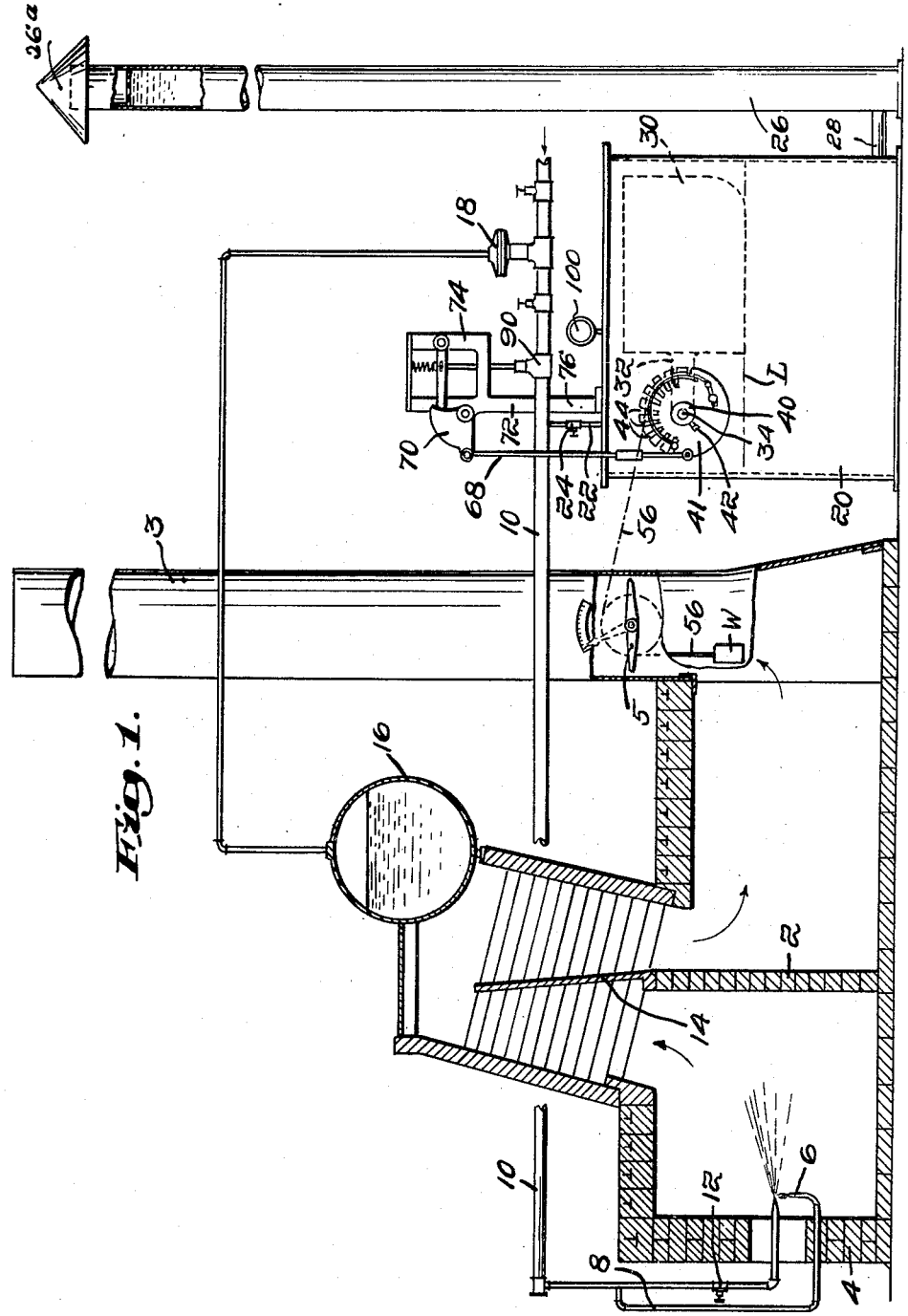

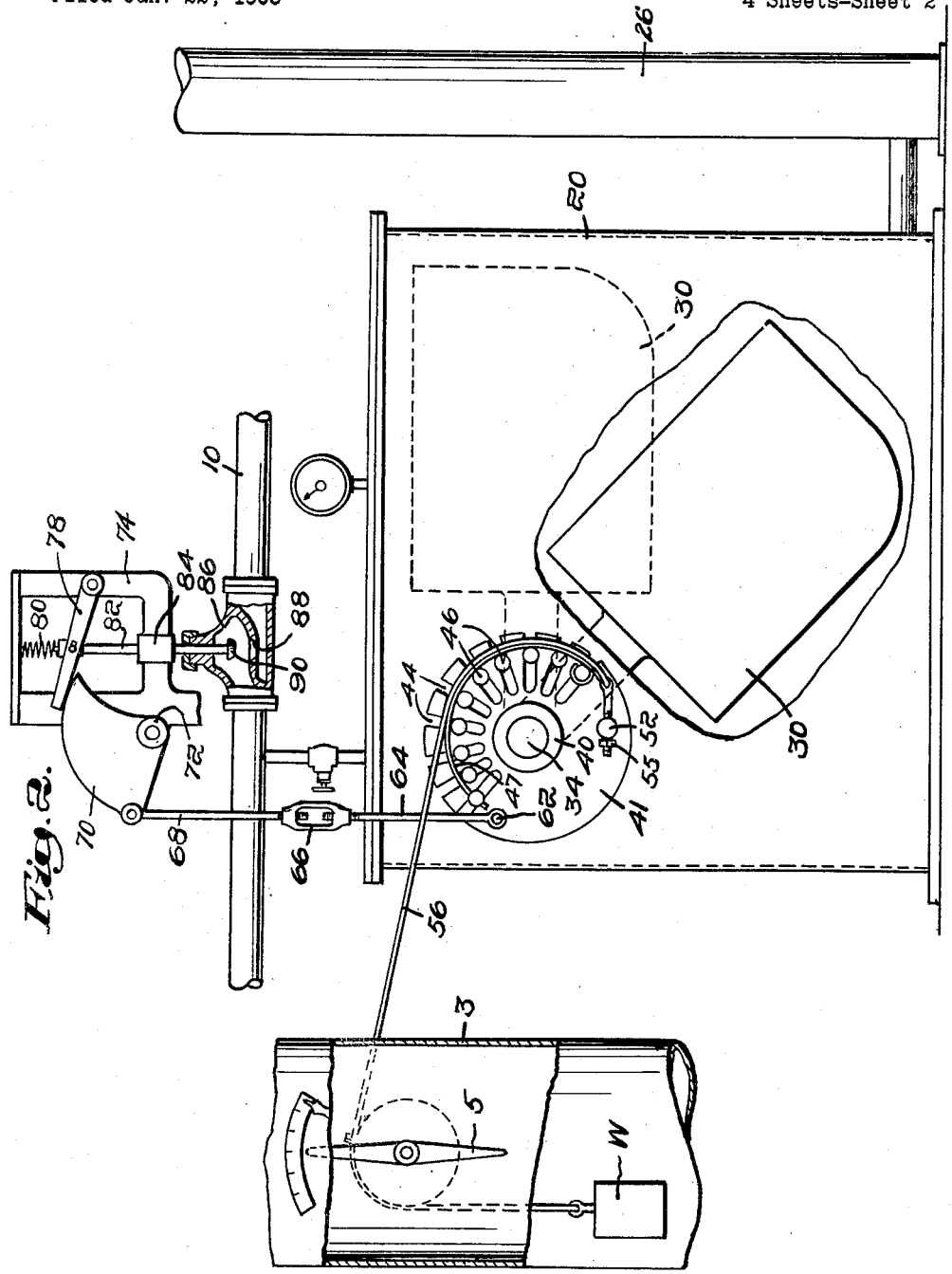

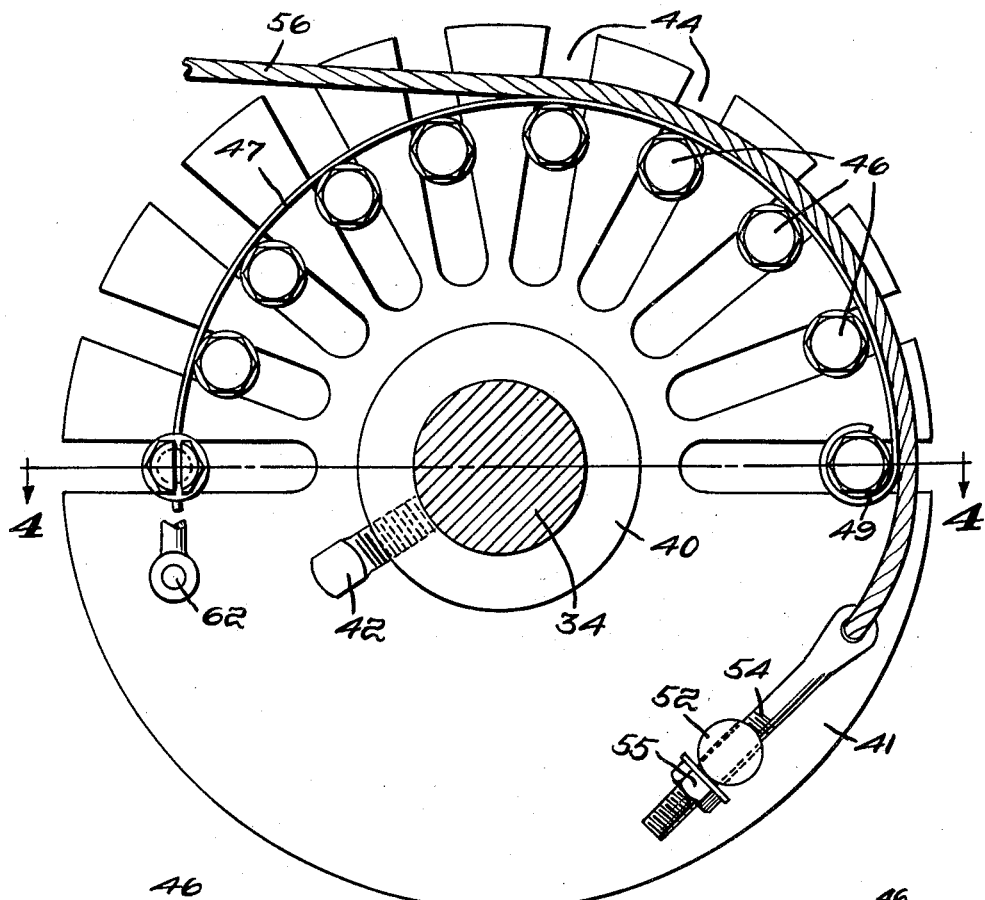
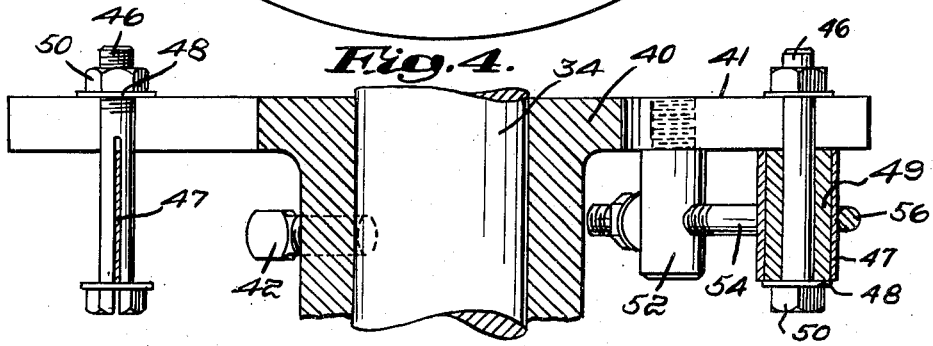

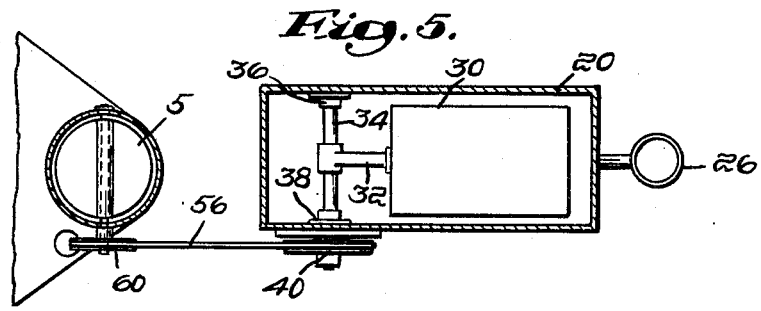
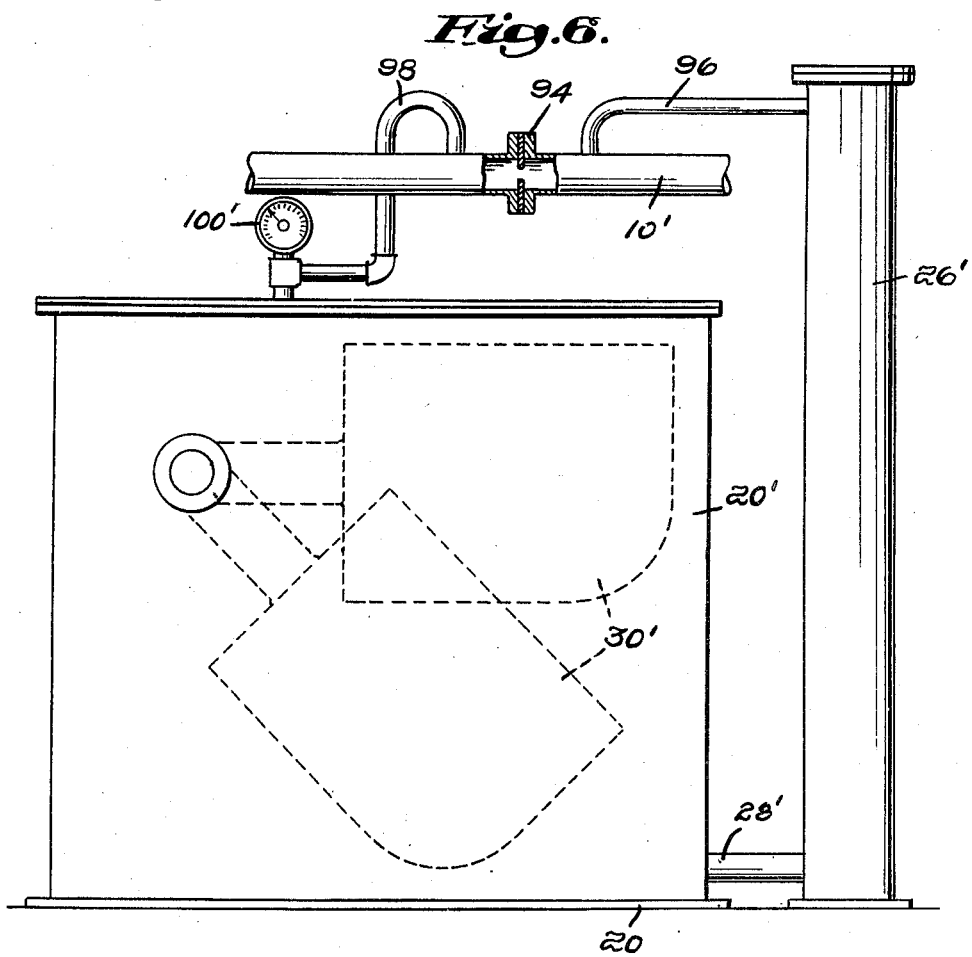

2,777,513

CONTROL APPARATUS AND PROPORTIONING DEVICE FOR FUEL AND COMBUSTION AIR

Duluth G. Cooper, Hodge, La.

Application January 22, 1953, Serial No. 332,617

1 Claim. (Cl. 158—119)

This invention relates generally to an improved method and apparatus for controlling and regulating the flow of two or more fluid bodies which may be desired to be brought together in a particularly blended relationship, and more especially the invention is concerned with a novel combustion control apparatus for regulating the flow of combustion air and fuel to the combustion chamber of a pressure fired boiler.

Heretofore a considerable number of devices have been proposed for regulating damper settings in various types of boiler installations in order to prevent excessive steam pressures or to maintain a desired pressure condition. A principal objection to these prior art devices is that there occurs no provision for maintaining in effect maximum combustion efficiency when variations in pressure in the fuel line, or at other points, takes place. Furthermore, these prior art devices employ various control elements of a somewhat complicated nature which are subject to breakdown and repair, and require constant supervision.

The present invention aims to provide an improved control apparatus which may be employed to regulate the flow of two or more fluid materials in connection with various types of operations and with a view to maintaining a desired proportionate relationship between the blended fluid bodies at all times. It is also an object of the invention to devise a special combustion control apparatus for regulating combustion air and fuel so as to provide constantly for maximum combustion efficiency by means of adjustments made from time to time in accordance with changes in pressure in the fuel line. Still another object is to provide a control which not only maintains a perfect combustion mixture of materials passing into the combustion chamber, but which may, in the event of pressure drop in the fuel line, operate to stop the flow of fuel and thus provide a safety fuel shut-off for boilers of the pressure fired type. Still another object of the invention is to devise an apparatus of the class indicated which is composed of a relatively small number of parts; which is of simple construction; and which is extremely easy to operate and maintain in condition.

These and other objects and novel features will be more fully understood and appreciated from the following description of a preferred embodiment of the invention selected for purposes of illustration and shown in the accompanying drawings, in which Fig. 1 is a view in elevation showing parts of my combustion control apparatus associated with a typical pressure fired boiler and combustion chamber unit;

Fig. 2 is another elevational view showing an hydrostatically controlled cam mechanism and valve shut-off associated with the damper mechanism of the boiler assembly shown in Fig. 1;

Fig. 3 is a detail elevational view of the cam mechanism employed to control the damper setting;

Fig. 4 is a cross-section taken on the line 4—4 of Fig. 3;

Fig. 5 is a horizontal sectional view of the hydrostatically operated control mechanism; and Fig. 6 is an enlarged side elevational view of a modified hydrostatically operated control indicating two positions of the float member therein.

The control apparatus of the invention comprises in general two basic components including a pressure sensing arrangement and a proportioning device which operates under the control of the pressure sensing arrangement. These two components are in accordance with the invention employed to control and regulate the blending together of two fluid bodies in a situation where at least one of the fluid bodies is normally flowing under pressure in some type of confining conduit, and usually under conditions where the pressure may be expected to change in a more or less predictable manner from time to time. The pressure sensing arrangement of the invention communicates directly with the fluid body under pressure and translates changes in pressure into mechanical displacement which is employed to power the proportioning device.

A highly typical instance of one set of working conditions of the character indicated is exemplified by the operation of a pressure fired combustion chamber and steam boiler, as illustrated in Figs. 1 to 5, inclusive, where the demand for steam may vary over a considerable range of pounds of steam required to be produced in order to take care of varying work loads. Here the two fluid bodies which are required to be controlled are a gas fuel and combustion air drawn into the combustion chamber by the draft of a stack in an amount controlled by a suitable dampering mechanism so as to make an efficient combustible mixture.

In one preferred embodiment of the invention, therefore, my combustion control may be employed to regulate combustion air which is being delivered in response to a draft demand so that a maximum combustion efficiency may at all times be maintained. The invention will, therefore, be first described in detail with reference being had to the pressure fired boiler arrangement shown in Figs. 1 to 5 but it should be understood that this is not done in any limiting sense and that various applications of the invention can be made, as will appear hereinafter.

Considering in greater detail, therefore, the combustion chamber and boiler of Figs. 1 to 5, numeral 2 denotes a combustion chamber having a stack 3 and a damper 5. The chamber includes a front wall 4 through which is supported a pilot burner 6. The pilot is furnished with gas fuel from a by-pass 8 of a main fuel conduit 10 which is, in turn, connected to a conventional fuel supply at an outside point not shown in the drawings.

A valve 12 when opened permits fuel to flow from the conduit 10 and to be ignited by the pilot burner 6 and combustion air is drawn through openings in the front wall, as diagrammatically illustrated in Fig. 1, in response to the draft of the stack 3. Hot combustion gases thus produced are guided along the path generally indicated by the arrows at the left-hand side of Fig. 1. These gases pass over and down around a baffle 14 and out through the stack 3. The combustion gases are thus caused to circulate around a boiler member 16 in which steam is produced in the usual manner. Flow of fuel in the conduit 10 is regulated to produce and maintain a desired steam pressure by the combined action of the fuel and a steam regulating valve 18 of some conventional type, such as is commonly employed for this purpose.

In accordance with the invention I provide for use with the above described conventional structure a pressure sensing apparatus comprising a tank 20 for holding a body of liquid, such as water, in sufficient volume to fill a substantial part of the tank, as has been suggested diagrammatically by the water level line L. The tank at its upper side is directly connected to the fuel conduit 10 by a pipe 22, having a shut-off valve 24 therein. At the bottom of the tank 20 is a tubular member 28 communicating with a standpipe 26 in which a column of liquid from the tank may rise to varying levels in response to pressure in the tank 20. Arranged to be supported by the body of liquid in the tank 20 is a float member 30 which has an arm 32 fast on a shaft 34 as is better shown in Fig. 5. The latter shaft is rotatably supported between two sides of the tank 20 in suitable bearings, as 36 and 38.

It is pointed out that the structure described comprises an extremely simple but accurate pressure sensing means which is constantly maintained in communication with the flow of fuel in the conduit 10 and therefore any appreciable change in pressure in the fuel line 10 will be instantly reflected in a change in the level of liquid in the tank 20. Since the pressure of the fuel line is exerted against the liquid level some liquid is constantly displaced into the standpipe 26 so that if a drop in pressure in the conduit 10 occurs, the liquid in the standpipe will force the liquid in tank 20 to rise and, similarly, a rise in pressure in the fuel line 10 will cause a pressure against the liquid in the tank and more liquid will forced into the standpipe. These changes are conveniently translated into mechanical movements by the action of the float and the resulting rotation of the shaft.

It will be observed that with a pressure sensing arrangement such as described there is a very little mechanism to get out of order or to be maintained. In order to prevent evaporation of liquid from the standpipe 26 and hence improper operation, I may introduce at the top of the column of fluid in the standpipe a second liquid of a relatively lower specific gravity, as suggested in Fig. 1, so that it remains at the top regardless of change in height of the column of the first fluid. The second fluid may, for example, be an oil having a relatively high evaporation temperature so that it may be expected to last for considerable periods. To prevent water due to rainfall from collecting in the standpipe when the latter member is exposed to atmospheric conditions, there may also be provided a breather hood 26a.

Arranged to operated under the control of the pressure sensing apparatus described, is the proportioning device earlier referred to, comprising essentially a special proportioning cam mechanism and also a safety fuel cut-off linkage associated with the cam mechanism. The cam mechanism noted is powered by rotative movement of the shaft 34 which has one extremity extending out through the tank 20, as may be more clearly seen in Fig. 5.

Attention is directed to Figs. 1 to 4, inclusive, in which the cam mechanism is more clearly shown. As illustrated particularly in Figs. 3 and 4, I provide an annular cam body comprising a hub 40 and an outer flange 41. The hub is secured on the shaft 34 in fixed relationship by means of a set screw 42. Formed in the flange 41 are a plurality of radially extending spaced-apart slots 44. Supported through these slots are a number of threaded stop elements 46 which are adapted to be tightly held in any desired position of radial adjustment in their respective slots by means of tubular spacers 49, washers 48, and nuts 50. A cam strip 47 is secured in a slot in one of the stops 46 and secured by a coiled end portion about the opposite stop in the series. Intermediate portions of the strip are conformed to and held against the remaining stops to define an adjustable curved cam surface.

Also mounted in the flange 41 is a post 52 formed at its upper end with an opening in which is threaded an adjustable anchor bolt 54 bearing an adjustment nut 55 thereon. At one end of the anchor bolt is fastened a flexible cable 56 which is normally held in close proximity to the flange 41, as shown in Fig. 4. The cable has one end extending outwardly for a short distance along a curved path which is defined by the cam surface of strip 47 and with which portions of the member 56 come into contact. At its outer end the cable 56 is attached to a pivoted damper frame 60, as shown in Fig. 5, in which is received the damper 5. Suspended from one side of the damper structure is a weight W. It will be apparent that the position of the cam mechanism will change in response to movement of the float and shaft 34. Therefore, as gas pressure changes in the fuel line, the cam mechanism will vary the setting of the damper. If, therefore, the damper is independently adjusted so as to provide for maximum combustion efficiency at one given pressure value, and if adjustment means are employed to obtain maximum combustion efficiency for each one of a series of successive damper settings corresponding to a series of different fuel pressure values, it is possible to always ensure a substantially correct proportion of air being delivered at any time when the fuel is flowing at any one of the particular pressure values noted. This, in effect, constitutes an important aspect of the novel method of proportioning of the invention and when implemented by establishing a series of predetermined cam points through which a curved cam surface must pass, it is possible to provide for a substantially constant maximum efficiency of combustion at all pressures at which fuel may be expected to flow under a known work load.

In this connection an important feature of the invention, therefore, is the adjustable cam mechanism described, the purpose of which is to provide a means for selectively varying the arc of curvature of a cam surface in relation to a series of different pressure values in the fuel line whereby for each one of these pressure values the cam surface will include a curved surface forming portion adapted to cause the damper cable to assume a position such that air will be delivered in the correct amount to provide for maximum combustion efficiency.

Thus, assuming that the combustion chamber is in operation and steam pressure is brought up to one specific operating requirement, the damper is first roughly adjusted by hand to provide an excess of air and carbon dioxide and analyses are made by use of an Orsat instrument until the supply of air is cut back to a point where maximum combustion efficiency is obtained. The damper is then connected to the cam mechanism through the operating linkage and one of the stop elements in its respective cam slot, ordinarily the first stop element, as viewed at the right-hand side of Fig. 3, is then secured so as to fix this damper position for the particular pressure value of the fuel at that point. When it is necessary, as it frequently will be, to increase or lower the gas burner pressure to another value, or if the pressure changes for any other reason, the damper may again be adjusted to an experimentally determined position until maximum combustion efficiency is obtained. In making this second adjustment a second stop element, i. e., the one immmediately adjacent to the first above noted stop element, may be moved in its slot to increase or decrease the distance between the cam center and the cam strip 47. When correctly located the second stop element is secured in place. This operation is repeated until a desired range of settings has been worked out.

In connection with the pressure sensing means and the proportioning device described, I may also desire to include a fuel safety cut-off mechanism which has been shown in Figs. 1 and 2. As noted therein a second post 62 may be mounted in the cam flange 41 and to this post is pivotally attached a rod 64, in turn adjustably connected by a turn buckle 66 to another rod 68. The latter rod is pivotally secured to a cam 70 also pivoted in a boss 72 formed on a valve casing 74. If desired, the travel of the rod 64 may be extended by substituting therefor a suitable pivoted linkage of well known character.

A bracket 76 supports the valve casing 74 just above the upper side of the tank 20. The cam 70 is arranged to engage and hold a lever 78 against a spring 80. The lever is fastened to a valve stem 82 which is mounted in a bearing 84 and projects through the casing 74. At its lower end the valve stem 82 is slidably supported in a valve fitting 86 connected into the conduit 10, as shown in Fig. 2, and carries a valve head 90 which is adapted to seal with a valve seat 88.

The operation of this fuel cut-off mechanism is as follows:

In the event of pressure drop from gas failure in the fuel line 10, or even curtailment requirements to a point where gas being delivered to the burners is sufficiently reduced to snuff out the burners, the float 30 will then take such a position as to force the links 64 and 68 downward, disengaging the lever 78 from cam 70, thereby permitting spring 80 to force lever 78, valve stem 82, and valve head 86 into a sealed position against the valve seat 88. This stops the flow of gas and prevents possible furnace explosion. In order to more fully understand the operation of my improved method and control apparatus, a discussion of actual values and operating conditions may be considered.

As illustrative of specific values and conditions with which the mechanism of the invention may be employed, the following example is therefore given:

In general it is understood that approximately 10 cubic feet of air is required for complete combustion of one cubic foot of a fuel such as natural gas. Under ordinary conditions approximately 1.5 cubic feet of gas containing 1,000 B. t. u.'s are used to produce one pound of steam at a pressure of 500 lbs. Let it be assumed that fluid in the tank 20 and standpipe 26 are at levels such that the float 30 is in the position shown in Figs. 1 and 2 and it is desired to put the boiler in operation. The first step is to raise the lever 78, lifting valve head 86 from the valve seat 88, thus opening a passageway for fuel to move through the conduit 10 to the valve 12. Fuel is allowed to pass through the by-pass 8 and the pilot 6 is lighted by hand. The valve 12 is then opened, allowing passage of fuel into the combustion chamber of the burner which is ignited by the pilot flame 6. Valve 12 is further opened a sufficient amount to bring the boiler up to a desired operating pressure.

Assume that the boiler is brought up to pressure and the steam demand is about 10,000 lbs. per hour. This will require 15,000 cubic feet of gas. For combustion of fuel 150,000 cubic feet of combustion air will be required. To supply the necessary fuel to produce this steam it may be assumed that one pound pressure is required in the conduit 10 feeding to the burner combustion chamber. It will also be assumed that this boiler is designed to produce 100,000 lbs. steam per hour at 500 lbs. gage pressure. The stack is designed to supply sufficient draft which, in turn, supplies sufficient air for complete combustion.

It is pointed out that if damper movement in the opening of stack 3 is proportional to fuel fired or steam produced, and the stack has only sufficient capacity for full load requirements, the damper would be in a vertical or wide open position when the boiler is producing 100,000 lbs. per hour. From a closed to a wide open position the damper moves through an angle of 90°. If producing 10,000 lbs. per hour and movement of damper 5 were proportional, the damper would take a position of 9° or one-tenth of the full opening position. In practice this is not correct, hence the cam mechanism is provided with its variable contour.

With the boiler producing 10% of its rated capacity, the fluid in the tank 20 would be lowered one-tenth of its total depth. Assuming that the standpipe 26 has an area of one-tenth that of the tank 20, fluid would be raised ten times the amount lowered in tank 20. For each foot in height of liquid in standpipe 26 approximately 2.3 lbs. pressure will be required on the liquid in tank 20.

In order to provide for calibration of the cam mechanism it may be assumed that the cam strip is placed in a position in which it is concentric with the outer rim of the annular flange 41, a position in which it is known that the damper will be opened sufficiently to supply air in excess of efficient combustion requirements. Damper 5 is now connected to the cam mechanism and the boiler is producing 10,000 lbs. of steam per hour. At this point of production combustion efficiency is checked and found to be high in excess air.

The first two stop members with which the cable 56 comes into contact as it extends forwardly from its anchor bolt 54 are then shifted toward the center of the cam plate in order to slightly release the cable and thus close the damper 13 very slightly. This adjustment is continued until a point is reached where maximum efficiency is obtained.

Let it now be assumed that the boiler is operated to produce 20,000 lbs. of steam per hour with the contour of the cam mechanism permitting passage of excess combustion air by the damper. The stop elements next adjacent to the stop elements already secured for the 10,00 lbs. steam prduction point will be adjusted in the way above described until the contour of the cam mechanism is located and locked in a position to give maximum combustion efficiency at the 20,000 lb. production point. This operation is repeated throughout each 10,000 lb. interval to thereby provide for maximum combustion from 10% to 100% load.

It will readily be appreciated that under some operating conditions the static pressure may be sufficiently high as to require some further adjustment. For example, in the event that the static pressure is high, say a pressure value of 100 lbs., then a water column of approximately 230 feet would be required. This, of course, with higher pressures, would be impractical.

In such a case I may desired to utilize a differential pressure instead of the static pressure. Attention is directed to Fig. 6 wherein I have shown a differential pressure control arrangement comprising a fuel conduit 10' having supported thereon an orifice 94 of well known character which restricts flow and creates a pressure change in the line. A pipe 96 is connected into the conduit 10' at one side of the orifice, as shown, and communicates with the standpipe 26' sealed at its top and to which fluid is conducted through pipe 28' from a tank 20'. At the opposite side of the orifice is another pipe 98 which communicates through a gage 100' with the tank 20'. Change in differential pressure in the line 10' operates to position the float 30' in the manner already described.

From the foregoing description it will be evident that I have provided a novel control apparatus for generally proportioning fluids and particularly suited to controlling combustion efficiency and combustion air in accordance with any one of several different variables, including (a) Static pressure of fuel which is supplied to a burner;

(b) Pressure differential across an orifice in a fuel line to a burner; and (c) Pressure in the steam line of a unit being controlled.

The apparatus may be so employed as to be connected either directly or indirectly with the damper system or air furnishing mechanism of a burner. The principle of using a hydrostatic control of the type generally indicated may be very desirably employed in mixing and proportioning various other types of fluid materials of the nature already indicated, as well as others.

While I have shown and described preferred embodiments of the invention, it should be understood that the invention may be practiced in modified forms in accordance with the scope of the invention, as defined by the appended claim.

Having thus described my invention, what I desire to claim as new is:

In a combustion chamber and pressure-fired boiler apparatus having conduit means for furnishing fuel under pressure to the combustion chamber, means for mixing combustion air with the fuel, damper means for regulating the demand for said combustion air, a combustion control comprising hydrostatically operated pressure sensing means connected to said fuel conduit means, a rotatable cam proportioning device responsive to the pressure sensing means, connector means responsive to movement of the proportioning device for operatively connecting the said damper to the proportioning device, a connector adjusting device for changing the setting of the damper relative to the proportioning device and a valve structure under the control of the said proportioning device for closing the said fuel conduit means in response to a drop in pressure below a predetermined minimum value therein.

References Cited in the file of this patent

UNITED STATES PATENTS

| | | |
|---|---|---|
| 1,758,828 | Fisher et al. | May 13, 1930 |
| 1,833,607 | Greenfield | Nov. 24, 1931 |
| 2,275,638 | Miner | Mar. 10, 1942 |

FOREIGN PATENTS

| | | |
|---|---|---|
| 120,679 | Great Britain | Nov. 21, 1918 |